United States Patent

[11] 3,603,941

[72] Inventor Jacob Koorneef
Emmasingel, Eindhoven, Netherlands

[21] Appl. No. 753,125
[22] Filed Aug. 16, 1968
[45] Patented Sept. 7, 1971
[73] Assignee U.S. Philips Corporation
New York, N.Y.
[32] Priority Aug. 31, 1967
[33] Netherlands
[31] 6712006

[54] COMBINATION OF TWO OR MORE SHIELDED MAGNETIC HEADS HAVING AT LEAST ONE WRITING HEAD AND AT LEAST ONE READING HEAD

4 Claims, 3 Drawing Figs.

[52] U.S. Cl. ...... 340/174.1 F, 29/603, 179/100.2 C
[51] Int. Cl. ...... G11b 5/10, G11b 5/28
[50] Field of Search ...... 179/100.2 C, 100.2 MI; 340/174.1 F; 346/74 MC

[56] References Cited

UNITED STATES PATENTS

| | | | |
|---|---|---|---|
| 3,042,753 | 7/1962 | Iwamura | 179/100.2 |
| 3,064,333 | 11/1962 | Kristiznsen et al. | 179/100.2 |
| 3,079,467 | 2/1963 | Rettinger | 179/100.2 |
| 3,432,839 | 3/1969 | Stapper | 340/174.1 |
| 2,852,618 | 9/1958 | Hansen | 179/100.2 |
| 3,043,918 | 7/1962 | Fawcett | 179/100.2 |
| 3,211,843 | 10/1965 | Dundovic et al. | 179/100.2 |
| 3,321,586 | 5/1967 | Krones | 179/100.2 |

OTHER REFERENCES

George, J. C., et al., " Copper Shield For Ferrite Heads," IBM Tech. Disc. Bull., Vol. 7, No. 6, Nov. 1964, P. 495

*Primary Examiner*—Bernard Konick
*Assistant Examiner*—Vincent P. Canney
*Attorney*—Frank R. Trifari ABSTRACT: A shielded multiple magnetic head wherein the heads are electrically screened from each other by a box-shaped enclosure of electrically conductive material. The bottom of the enclosure surrounds the lower portion of the head. The top of the enclosure interrupts the head between the upper and lower portions thereof.

PATENTED SEP 7 1971 3,603,941

INVENTOR

JACOB KOORNEEF

BY Frank R. Trifari

AGENT

COMBINATION OF TWO OR MORE SHIELDED MAGNETIC HEADS HAVING AT LEAST ONE WRITING HEAD AND AT LEAST ONE READING HEAD

The invention relates to a combination of two or more magnetic heads having at least one writing head and at least one reading head, each consisting of a readily magnetizable core which is electrically nonconductive or poorly conductive. Each one is substantially annular and comprises a nonmagnetisable effective gap, wire turns being arranged around part of said core. The heads are screened electrically from each other in that at least one of the heads is arranged in a box of an electrically readily conductive material, said box having an aperture on the front through which the front face of the head projects.

Such combinations of writing heads and reading heads are used, for example, in digital tape-reading/ writing apparatus in which a reading head arranged immediately behind the writing head reads the signal written a moment before. In this manner a substantially instantaneous check of the writing process is obtained.

In combination as meant above, a distance commonly used between the writing gap and the reading gap is, for example 4 mm.

Alternatively, a few of the above-mentioned combinations are used beside each other, that is to say covering adjacent parallel tracks on a record carrier. The distance between two gaps of combination located beside each other in this manner then is, for example, in the order of magnitude of 1 mm.

Such combinations of writing and reading heads are preferably connected together mechanically to form one composite magnetic head, so that the position of the various gaps relative to each other is accurately fixed.

As is known, in order to be able to write and read also very high frequency signals (for example, 1.5 mc./s.) magnetic heads are often used, the magnetizable circuit of which consists of a sintered oxidic ferromagnetic material. These materials are electrically nonconductive or very poorly conductive.

When the distances between a writing head and a reading head inanabove-described combination lies in the order of magnitude as described above, a problem arises in that it should be ensured that the direct influence of a read signal by the magnetic and electric condition of a writing circuit be suppressed.

This influence, the crosstalk may have a dual cause. Firstly, there is capacitive inductive crosstalk which occurs as a result of a direct influence of the magnetic field in a reading gap, by the magnetic field produced in and around the writing gap. Secondly, there is the capacitive crosstalk. This latter occurs as a result of the electric capacitances between the current-conducting components of a reading head and those of a writing head.

The invention relates to a combination as mentioned above, in which the capacitivve crosstalk is considerably smaller than in a combination used so far.

It has been found that in a conventional combination of a reading head and a writing head located behind each other and having a mutual gap distance of approximately 4 mm, capacitances of, for example, $10^{12}$ pF occur between the current-conducting components of the two heads. The requirement must be imposed upon a reading head, that the signal-to-noise ratio is larger than approximately 26 This requirement will mean that capacitances of above $10^{13}$ pF are inadmissible.

In order to reduce the said capacitances, several measures are known. It is known, for example, to provide screening plates of an electrically readily conducting material on the sides and on the lower side of a magnetic head. Since, however, the front face of a head comprising the effective gap must be free for contacting a record carrier, the front face cannot be provided with such a screening plate, so that a considerable "leak " remains in the screening of the head.

In order to "seal " said "leak " the whole front face is covered with a thin electrically conductive layer which is electrically connected to the other screening plates. In this manner the head is, as it were, in a closed box of a screening material. Such a layer across the front face, however, involves many drawbacks: difficulties arise not only with respect to the required uniform resistance to detrition of the front face but in particular the larger distance which is formed between the record carrier and the effective gap is very harmful to both the writing and the reading process.

The invention provides a considerably better solution to "-seal " the "leak " in the screening and for that purpose is characterized in that an electrically conducting screening which intersects the magnetisable core of the head and is electrically connected to the box is present also in the front of the box.

This screening is located on the upper side of the current conducting elements, while nevertheless the front face of the head remains free for contacting a record carrier. Since the current-conducting elements are thus screened on all sides, it is no objection that the pole shoes and the effective gap project beyond the screening. It is found that the capacitances occurring thus remain restricted to values below $10^{13}$ pF.

The invention gives a better efficiency when, according to a further feature of the invention, each head of the combination comprises the above-described screening on the front of the box.

According to another characteristic feature of the invention, the screening on the front of the box may have the form of a comb. Such a shape has the advantage that losses possibly occurring in the form of eddy-currents in the screening are additionally reduced, while the screening effect, compared with a screening which fully seals the box, is substantially entirely maintained.

The efficiency of the invention is maximum when according to a fourth characteristic feature of the invention the electrically conductive screen in the front of the box fully seals the box.

The invention also comprises a method of manufacturing a magnetic head belonging to any of the described combinations and provided in a screening as described above, in which the electrically conductive box is fully closed. According to said method, first a U-shaped core part provided with wire turns is secured in a nonmagnetisable housing, for example, by means of a casting resin with the limbs of the U pointing upwards. The sidewalls and the lower side of said housing consist of an electrically readily conductive material, so that thus the part of the core is in a conductive box. Then, likewise according to a known method, the upper side of the construction thus obtained is ground flat so that an even, smooth upper surface is obtained which is formed by both the sidewalls of the box and the limbs of the U and, if required, by the housing material or filling material between the core and the sidewalls, for example, nonmagnetisable ceramic or epoxy resin.

The method is characterized in that after the above operations and prior to securing the poleshoe unit to the limbs of the U-shaped part of the core, an electrically readily conducting layer is provided on the upper surface and entirely covers said surface.

The maximum permissible thickness of this layer is dependent upon the frequency: at high frequencies a few tenths of a micron, at low frequencies a few tens of microns.

According to the invention, the screening layer is preferably provided either by providing on the said evenly smoothly ground upper surface a foil of the relative material, or depositing said material onto the said surface from the vapor phase.

In order that the invention may be readily carried into effect, it will now be described in greater detail, by way of example, with reference to the accompanying drawing, in which.

Figure 1:
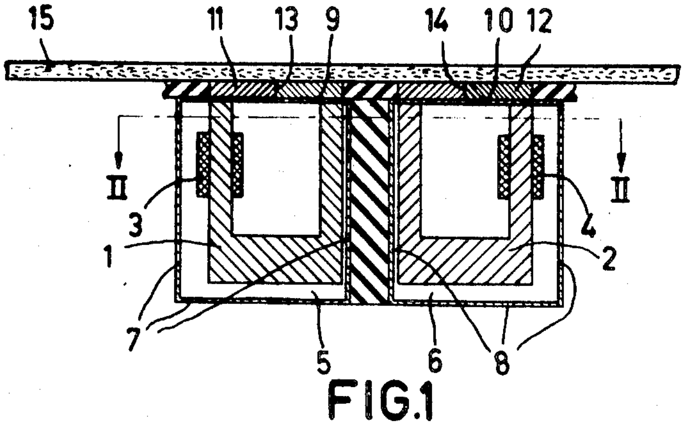
FIG. 1 is a cross-sectional view of the combination of a writing head and a reading head which are united to form one mechanical assembly. Both heads cover the same track on a record carrier and both heads are provided with a capacitive screening according to the invention.

Referring now to FIG. 1, reference numerals 1 and 2 denote U-shaped components of a readily magnetisable material, electrically nonconductive or poorly conductive material, for example, sintered oxidic material. These U-components 1 and 2 are provided with wire turns 3 and 4, and are accommodated in housing 5 and 6, respectively, of a nonmagnetisalbe material, for example, also a sintered oxidic material, in which they are secured by means of a cement. Around said housing material 5 and 6, respectively, electrically conductive screening plates 7 and 8, respectively, are arranged on the lower side and on the sides. The U-components 1 and 2 of the core are thus arranged in a box of an electrically conducting material. According to an embodiment of the invention, such a box is closed on the upper side by layers 9 and 10, respectively, of an electrically readily conducting material. It has been found that also when the box is not entirely sealed on the upper side and the layers 9 and 10, respectively, thus do not, for example, fully engage the plates 7 and 8 but are connected thereto in an electrically conductive manner, a considerable screening effect is obtained nevertheless.

The layers 9 and/or 10 may alternatively have the shape, for example, of a comb. Such a comb-shaped layer provides a strong reduction of possibly occurring eddy current losses, while nevertheless the screening effect is large. For example, the teeth of the comb have a width of0.1 mm. and an intermediate space of 10 micron.

The magnetisable circuits of the two heads are closed by means of the pole shoe units 11 and 12 respectively, which comprise the effective gaps 13 and 14, respectively. These effective gaps 13 and 14 cooperate with a record carrier 15 which is movable relative to said gaps.

So besides by the effective gaps 13 and 14 the two magnetic circuits are each interrupted by the electrically conducting nonmagnetisable layers 9 and 10. Therefore, in order not to hamper the magnetic flux in the circuits the thickness of said layers 9 and 10 may not exceed a given value. This thickness depends upon the frequency used and for high frequencies it lies in the order of 0.1 micron, while for the lowest frequencies a thickness in the order of 10 microns is permitted.

Both heads are mechanically secured together in a conventional manner by means of material 16, for example, a nonmagnetisable ceramic material.

Figure 2:
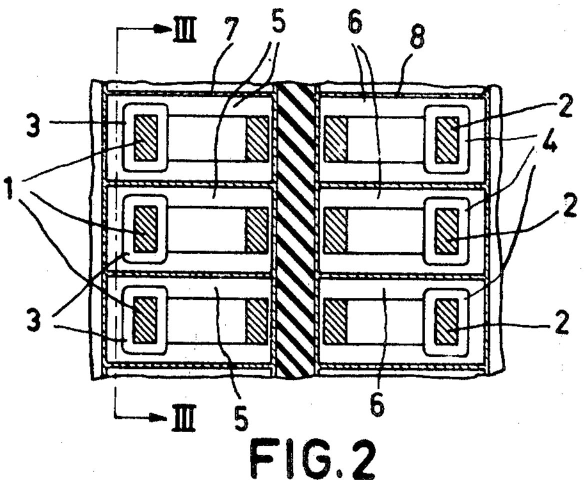
FIG. 2 is a cross-sectional view through a composite head shown in FIG. 1 taken on the line II—II, which three combinations of a writing head and a reading head each cooperate with another one of three parallel tracks on a record carrier.

In FIG. 2 corresponding components are denoted by the same reference numerals. The FIGURE is a cross-sectional view through a head shown in FIG. 1 which cooperates with three parallel tracks on a record carrier. Each of the U-shaped circuit parts which is provided with wire turns, is accommodated in a box of electrically readily conducting material 7, 8.

Figure 3:
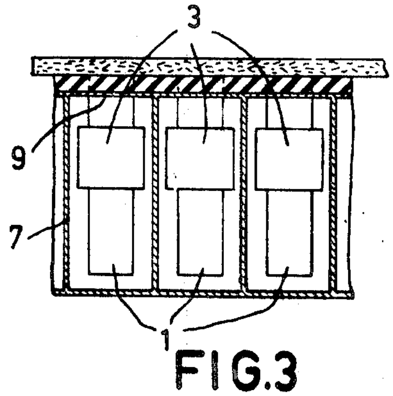
FIG. 3 is a cross-sectional view through the composite head shown in FIG. 2, taken on the line III—111.

In fIG. 3 it is shown, how a screening 9 according to the invention is present also in such a three-track-head.

What is claimed is:

1. A shielded multiple magnetic head comprising two or more magnetic heads including at least one writing head and at least one reading head, each of said heads being composed of a core of magnetic material which is electrically poorly conductive and is substantially annular with a nonmagnetic effective gap, wire turns being arranged around at least one part of each core, each head having an upper portion including a front face containing said gap and a wire turn supporting lower portion for completing the magnetic core, said heads being screened electrically from each other by an enclosed box of electrically conductive material completely surrounding said lower portion of at least one of the heads, the upper face of said box interrupting said head between said upper and lower portion, the upper portion of said one of said heads projecting above the upper face of said box, said upper face being an electrically conductive screening connected to the box in an electrically conductive manner for interrupting said magnetic head between said upper and lower portions.

2. A combination as claimed in claim 1, wherein each head lower portion is accommodated in an enclosed box.

3. A combination as claimed in claim 1 wherein that part of the electrically conductive screening of the upper face of the box interrupting said head is comb shaped.

The restriction requirement is noted. As stated by the Examiner, Group 1 is elected, relating to the article. The restriction requirement is traversed however, in view of the fact that the subject matter of both sets of claims are so interrelated that a record of one set would be duplicative of a search on the other set. In the interests of saving applicant the expense and time necessary for filing of a divisional application, and in the interest of the public in attempting to reduce the backlog of the Patent Office, particularly where duplicative effort is involved, it is respectfully requested that an action on the merits be rendered upon group 11.

Amendments have been made to the disclosure where electrically conductive manner.

4. A combination as claimed in claim 1, wherein the electrically conductive screening in the upper face of the box fully seals the box.

PO-1050
(5/69)

UNITED STATES PATENT OFFICE
CERTIFICATE OF CORRECTION

Patent No. 3,603,941 Dated September 7, 1971

Inventor(s) JACOB KOORNEEF

It is certified that error appears in the above-identified patent and that said Letters Patent are hereby corrected as shown below:

Col. 1, line 46, after "crosstalk" insert --,--;
line 47, cancel "capacitive" and insert --the--;
line 55, "capacitivve" should be --capacitive--;
line 60, "$10^{12}$" should be --$10^{-2}$--;
line 63, after "26" insert --dB.--;
line 64, "$10^{13}$" should be --$10^{-3}$--
Col. 2, line 22, "$10^{13}$" should be --$10^{-3}$--;
Col. 3, line 12, "nonmagnetisalbe" should be --nonmagnetisable--;
Col. 4, lines 33 to 45, cancel in their entirety.

Signed and sealed this 22nd day of August 1972.

SEAL)
ttest:

DWARD M.FLETCHER,JR.
ttesting Officer

ROBERT GOTTSCHALK
Commissioner of Patents